US011972039B1

(12) United States Patent
Salvemini (10) Patent No.: US 11,972,039 B1
(45) Date of Patent: Apr. 30, 2024

(54) AUGMENTED REALITY SKYDIVING SYSTEM

(71) Applicant: FlyTrack, LLC, Shrewsbury, MA (US)

(72) Inventor: Nicholas Jacob Salvemini, Shrewsbury, MA (US)

(73) Assignee: ARMaps, Shrewsbury, MA (US)

( * ) Notice: Subject to any disclaimer, the term of this patent is extended or adjusted under 35 U.S.C. 154(b) by 0 days.

(21) Appl. No.: 18/061,070

(22) Filed: Dec. 2, 2022

(51) Int. Cl.
| | | |
|---|---|---|
| *G06F 3/01* | (2006.01) |
| *A42B 3/04* | (2006.01) |
| *A63G 31/00* | (2006.01) |
| *G02B 27/00* | (2006.01) |
| *G02B 27/01* | (2006.01) |
| *G06T 19/00* | (2011.01) |
| *G09B 19/00* | (2006.01) |

(52) U.S. Cl.
CPC .............. *G06F 3/011* (2013.01); *A42B 3/042* (2013.01); *A42B 3/046* (2013.01); *A63G 31/00* (2013.01); *G02B 27/0093* (2013.01); *G02B 27/0101* (2013.01); *G02B 27/017* (2013.01); *G02B 27/0179* (2013.01); *G06T 19/006* (2013.01); *G09B 19/0038* (2013.01); *A63G 2031/005* (2013.01); *G02B 2027/0138* (2013.01); *G02B 2027/014* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 7,145,501 B1 * | 12/2006 | Manfred ................. | G01S 13/89 |
| | | | 342/120 |
| 9,354,447 B2 | 5/2016 | Abdollahi et al. | |
| 9,696,797 B2 | 7/2017 | Abdollahi et al. | |
| 9,863,772 B1 * | 1/2018 | Moyerman ............. | H04W 4/80 |
| 9,953,461 B2 | 4/2018 | Huang et al. | |
| 10,086,298 B2 * | 10/2018 | Romanenko ............ | G01M 9/02 |
| 10,238,980 B2 * | 3/2019 | Romanenko ........... | A63G 31/00 |
| 10,403,160 B2 * | 9/2019 | Knoblach ............ | G08G 5/0069 |

(Continued)

FOREIGN PATENT DOCUMENTS

| | | |
|---|---|---|
| EP | 3454175 A1 | 3/2019 |
| EP | 3695888 B1 | 12/2021 |
| WO | 2019195175 A1 | 10/2019 |

*Primary Examiner* — Fred Tzeng
(74) *Attorney, Agent, or Firm* — Jeremy Briggs (57) ABSTRACT

An Augmented Reality (AR) wearable display device is described. The device may be a skydiving helmet. The device may include a transceiver configured to receive a real-world environment view and a point of interest (POI) geolocation and POI altitude information. The device may further include a detection unit configured to detect AR wearable display device trajectory information. The device may further include a processor configured to determine a POI location in the real-world environment view based on the POI geolocation and the POI altitude information and the AR wearable display device trajectory information. The processor may further generate an AR image by overlaying a virtual object associated with the POI on the real-world environment view based on the POI location. The processor may further render the AR image on a display screen associated with the AR wearable display device. The display screen may be a helmet visor.

20 Claims, 6 Drawing Sheets

(56) References Cited

U.S. PATENT DOCUMENTS

| | | | | |
|---|---|---|---|---|
| 10,610,793 | B2* | 4/2020 | Romanenko | G01M 9/04 |
| 10,782,524 | B2* | 9/2020 | Haley | G06F 3/011 |
| 10,847,042 | B2* | 11/2020 | Rose | G08G 5/0039 |
| 10,935,987 | B2* | 3/2021 | Rose | G05D 1/0038 |
| 11,361,513 | B2* | 6/2022 | Lohr | G06F 3/012 |
| 11,553,310 | B2* | 1/2023 | Lin | H04L 5/0048 |
| 11,709,370 | B2* | 7/2023 | Olson | G02B 27/0179 |
| | | | | 345/8 |
| 11,711,782 | B2* | 7/2023 | Bao | H04B 17/24 |
| | | | | 455/456.1 |
| 11,749,126 | B2* | 9/2023 | Rose | G06T 3/4015 |
| | | | | 701/2 |
| 11,762,078 | B2* | 9/2023 | Choi | G01S 15/08 |
| | | | | 342/118 |
| 11,763,687 | B2* | 9/2023 | Rose | G01S 19/48 |
| | | | | 701/3 |
| 2015/0234462 | A1* | 8/2015 | Miller | G06T 1/20 |
| | | | | 345/8 |
| 2015/0235435 | A1* | 8/2015 | Miller | G09G 5/006 |
| | | | | 345/633 |
| 2016/0313790 | A1* | 10/2016 | Clement | G02B 27/0093 |
| 2017/0370726 | A1* | 12/2017 | Moyerman | H04W 4/025 |
| 2019/0219476 | A1* | 7/2019 | Romanenko | B64D 23/00 |
| 2020/0118449 | A1* | 4/2020 | Rose | G01S 13/882 |
| 2020/0398991 | A1* | 12/2020 | Haley | G01S 19/19 |
| 2021/0149200 | A1* | 5/2021 | Brown | G02B 27/0101 |
| 2022/0272592 | A1* | 8/2022 | Choi | H04W 64/00 |
| 2022/0365222 | A1* | 11/2022 | Rose | G08G 5/045 |
| 2023/0209494 | A1* | 6/2023 | Dai | H04W 64/00 |
| | | | | 455/456.6 |
| 2023/0228834 | A1* | 7/2023 | Gummadi | G01S 5/145 |
| | | | | 342/458 |
| 2023/0359197 | A1* | 11/2023 | Rose | G05D 1/101 |

* cited by examiner

AUGMENTED REALITY SKYDIVING SYSTEM

TECHNICAL FIELD

The present disclosure relates to an augmented reality (AR) skydiving system, and more particularly, to a skydiving helmet that renders AR images on a helmet visor.

BACKGROUND

Skydivers, wing suiters, and BASE jumpers (hereinafter referred to as skydiver[s]) generally wear protective gear during skydiving, wing suiting, and BASE jumping (hereinafter referred to as skydiving activity). The protective gear includes (but is not limited to) a skydiving helmet, parachute equipment, jumpsuit, etc. Many skydiving helmets are known to allow for the inclusion of external technology that may assist a skydiver during the skydiving activity. For example, the skydiving helmet may have altimeter slots near the ear section of the helmet in which a skydiver may insert an off-the-shelf audible altimeter to measure the skydiver's altitude, speed and acceleration during the skydiving activity, and notify the skydiver accordingly.

While a helmet with an altimeter may be beneficial to the skydiver, there may be instances where the skydiver may require additional assistance or information (e.g., safety information) during the skydiving activity. Further, the skydiver may desire to view the additional information in an easy-to-understand manner so that the information may not distract the skydiver during the skydiving activity.

Thus, there exists a need in the industry for a system to display additional information or data to the skydiver in a manner that may be convenient for the skydiver to view.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes an Augmented Reality (AR) wearable display device. The device may be a helmet that a skydiver may wear when the skydiver performs a skydiving activity. The device may be configured to display an AR image on a helmet visor, which may act as or be a device display screen. The AR image may include one or more virtual objects overlaid over a real-world environment view that the skydiver may view through the helmet visor. The virtual objects may be associated with one or more points of interest (POI) that may be visible in the real-world environment view. For example, the POI may be a drop zone for the skydiving activity, or waypoints that the skydiver may need to traverse during the skydiving activity.

In some aspects, the device may receive the real-world environment view from an image capturing unit that may be disposed in proximity to the device or be a part of the device. The device may additionally receive POI geolocation and POI altitude information from a server or a user device associated with the skydiver.

The device may include a detection unit that may detect device trajectory information when the skydiver wears the device and performs the skydiving activity. In some aspects, the device trajectory information may include a velocity, a geolocation, an altitude, an acceleration and a heading. Furthermore, the detection unit may include a Global Positioning System (GPS) receiver, an Inertial Measurement Unit (IMU), an altimeter, and combination thereof.

The device may be configured to determine a POI location in the real-world environment view based on the POI geolocation, the POI altitude information and the device trajectory information. Responsive to determining the POI location in the real-world environment view, the device may generate an AR image by overlaying a virtual object associated with the POI on the real-world environment view based on the determined POI location. The device may further render the AR image on the helmet visor/display screen.

The virtual object may indicate the POI location on the real-world environment view, and may further include additional information associated with the POI. For example, the virtual object may depict altitude information, temperature, GPS location, etc. associated with the POI. In an exemplary aspect, if the skydiver is participating in a skydiving contest and the POI are waypoints, the virtual object may depict "virtual points" that the skydiver may gain when the skydiver crosses each POI.

The present disclosure discloses a skydiving helmet that may facilitate the skydiver to view important information associated with the skydiving activity on the helmet visor. The helmet displays the information as virtual objects overlaid over the real-world environment view, and thus does not distract the skydiver when the skydiver performs the skydiving activity. The present disclosure also enables the skydiver to gamify the skydiving experience. Further, the skydiver is not required to carry any additional equipment, apart from the skydiving helmet, to view the AR image. Thus, the present disclosure enables the skydiver to view AR images without addition of any external or complex equipment to skydiving gear that the skydiver may wear.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

Figure 1:
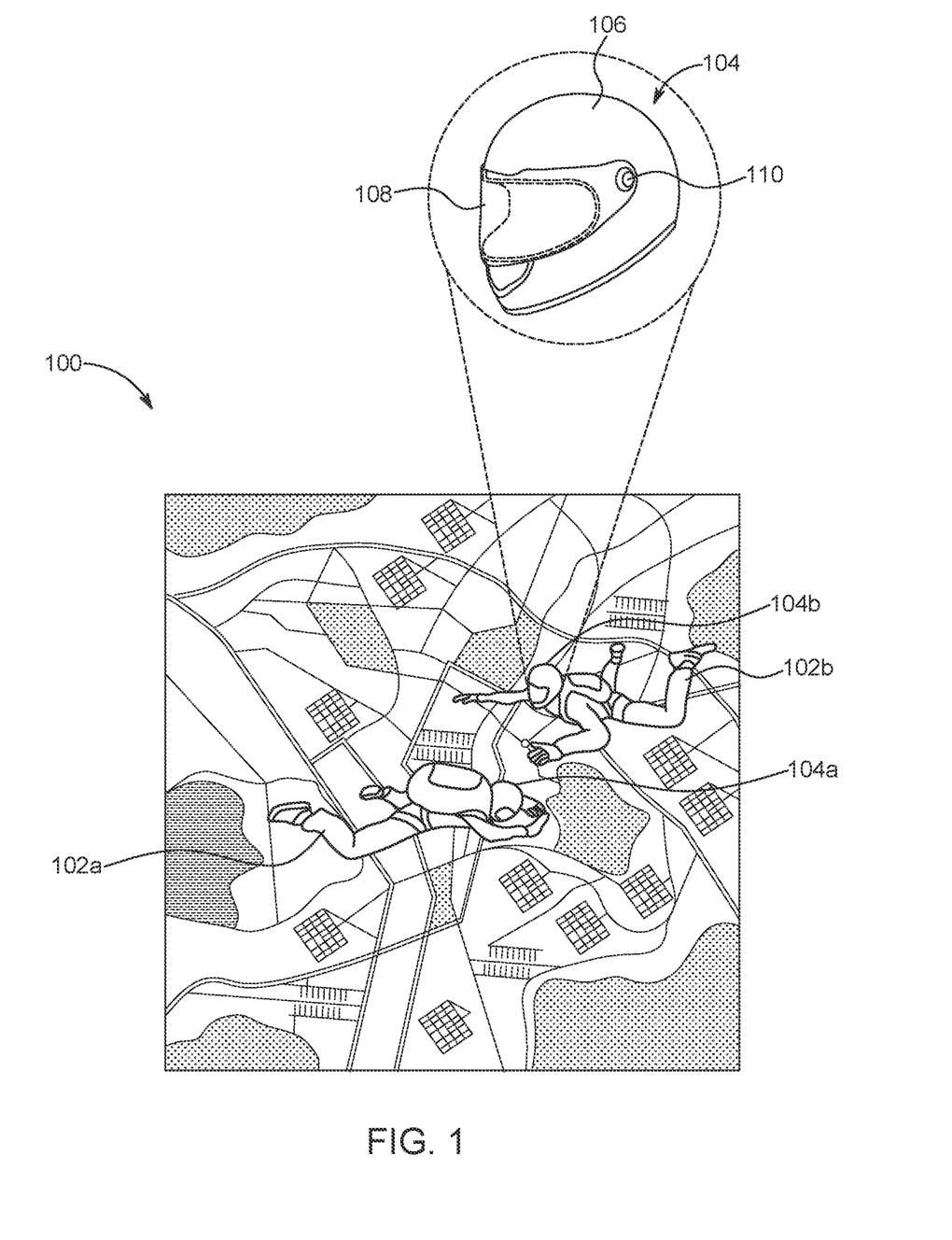
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. The environment 100 may include one or more skydivers 102a, 102b (referred to as a skydiver 102) who may be performing a skydiving activity. For example, the skydiver 102 may be diving from an airplane (not shown) from a predefined altitude over sea level. The predefined altitude may be, for example, 10,000 or 20,000 feet above the sea level.

The skydivers 102a, 102b may be wearing skydiving helmets 104a, 104b (referred to as a helmet 104), respectively. The helmet 104 may be a protective headgear that the skydiver 102 may wear to protect the skydiver's head during the skydiving activity. In addition, the helmet 104 may include functionality or features of an Augmented Reality (AR) display device. Stated another way, the helmet 104 may be an AR wearable display device, along with being a protective headgear for the skydiver 102.

The helmet 104 may include a helmet body 106 that may cover a substantial part of the skydiver's head, when the skydiver 102 wears the helmet 104. The helmet body 106 may be made of polycarbonate, fiberglass, carbon fiber, and/or the like. The helmet 104 may further include a visor 108 that may be rotatably attached with the helmet body 106 via a swivel mount 110. Although FIG. 1 shows one swivel mount 110, a person ordinarily skilled in the art may appreciate that the helmet 104 may include two swivel mounts that may connect opposite visor 108 sides to the helmet body 106. The swivel mount 110 may enable the skydiver 102 to rotate the visor 108 in one direction (e.g., clockwise) to open or unlock the visor 108, and in the other direction (e.g., anticlockwise) to close or lock the visor 108 in the helmet body 106.

The visor 108 may be a transparent screen through which the skydiver 102 may view the real-world environment. For example, the skydiver 102 may see a view of the ground when the skydiver 102 views the ground through the visor 108 during the skydiving activity. Further, in some aspects, the visor 108 may additionally act as or be a display screen that may be configured to display AR images. Stated another way, the visor 108 may be an AR display screen. Specifically, the skydiver 102 may view AR images on a visor 108 interior surface (not shown) when the skydiver 102 wears the helmet 104. The AR images may include virtual objects that may be superimposed or overlaid over a real-world environment view that the skydiver 102 may view through the visor 108. For example, when the skydiver 102 performs the skydiving activity and views the ground ("ground view") from the visor 108, the visor 108 may overlay virtual icons of specific locations or points of interest on the ground in the ground view.

In an exemplary aspect, the visor 108 may display a virtual icon for a drop zone location in the ground view, which may assist the skydiver 102 to view the drop zone location so that the skydiver 102 may accordingly maneuver skydiver 102 body movement to reach to the drop zone.

In other aspects, the visor 108 may display virtual icons in the ground view for targets or waypoints that the skydiver 102 may need to pass through or cross during the skydiving activity. For example, if the skydiver 102 is a trainee or participating in a skydiving challenge, the skydiver 102 may be allocated a "track" that the skydiver 102 may need to traverse during the skydiving activity. In this case, when the skydiver 102 views the ground from the visor 108, the visor 108 may display virtual icons for one or more waypoints along the track that the skydiver 102 may need to traverse, which may be overlaid on the real-world environment view.

In further aspects, additional information such as the difference between skydiver's current altitude and waypoint's altitude may be displayed, which may assist the skydiver 102 to maneuver skydiver 102 body movement to reach the corresponding waypoint.

In additional aspects, the visor 108 may be configured to display training instructions to the skydiver 102 when the skydiver 102 performs the skydiving activity.

Figure 2:
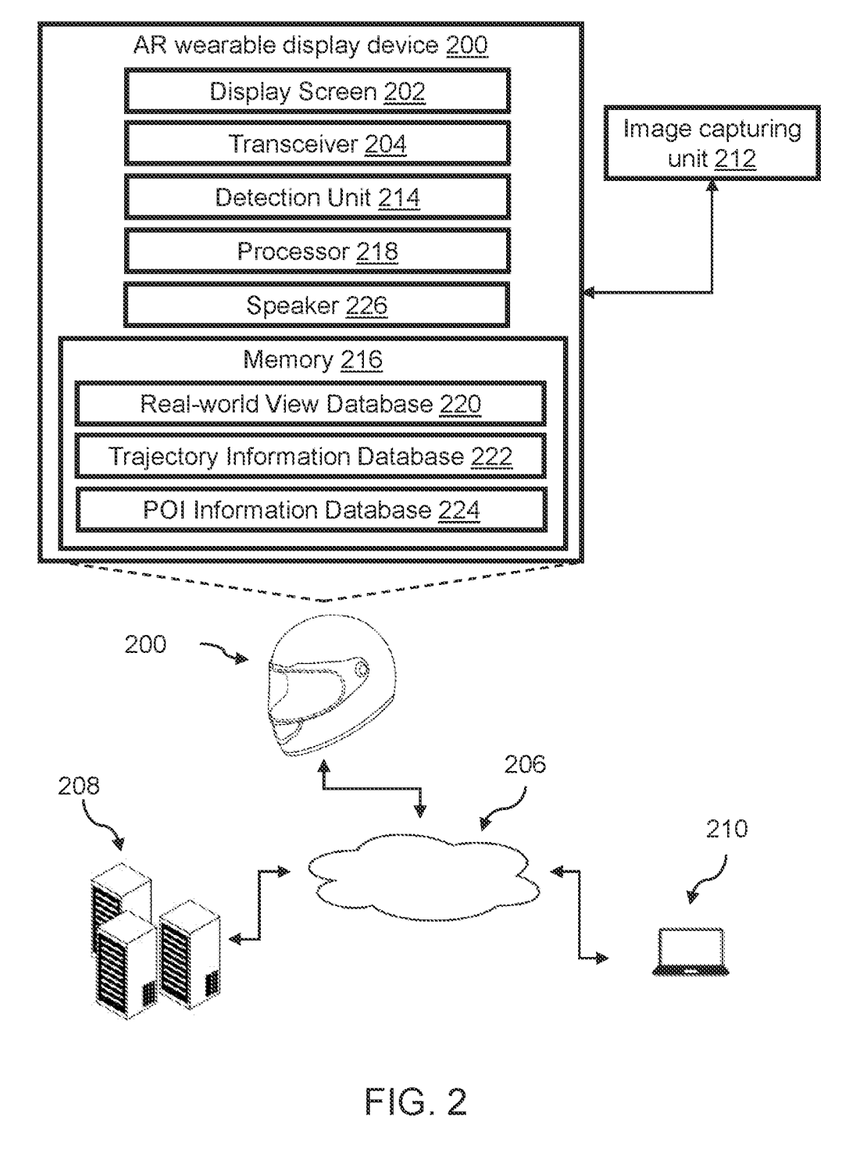
FIG. 2 depicts a block diagram of an example Augmented Reality (AR) wearable display device in accordance with the present disclosure.

The detailed working of the helmet 104 as an AR wearable display device may be understood in conjunction with FIG. 2.

FIG. 2 depicts a block diagram of an example Augmented Reality (AR) wearable display device 200 (or a device 200) in accordance with the present disclosure. While describing FIG. 2, references may be made to FIGS. 3-5.

The device 200 may be a skydiving helmet, which may be the same as the helmet 104. The skydiver 102 may wear the device 200 when the skydiver 102 performs the skydiving activity. The device 200 may include a helmet body (same as the helmet body 106, not shown in FIG. 2) and a helmet visor. As described in conjunction with FIG. 1, the helmet visor may be a display screen 202 on which the skydiver 102 may view Augmented Reality (AR) images when the skydiver 102 performs the skydiving activity.

The device 200 may include a transceiver 204 that may be configured to communicate with external devices via one or more networks 206. For example, the transceiver 204 may receive/transmit information, data, images, videos, notifications, etc., from/to a server 208, a user device 210 and/or an image capturing unit 212. The user device 210 may be associated with the skydiver 102 and the server 208 may be associated with a skydiving entity (e.g., firm) or an operator. The user device 210 may be, for example, a mobile phone, a laptop, a computer, a tablet, or any similar device with communication capabilities. Further, the image capturing unit 212 may be a camera that may be mounted on the device 200 (e.g., on the helmet body 106).

Figure 3:
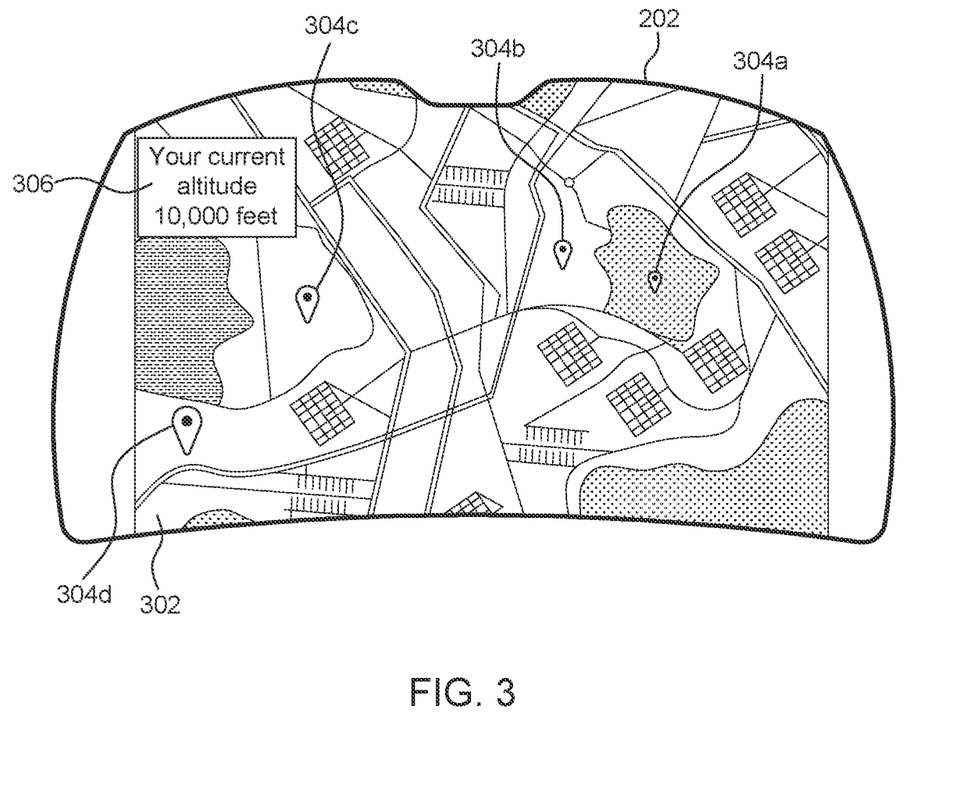
FIG. 3 depicts a first example AR image displayed on a display screen in accordance with the present disclosure.
Figure 4:
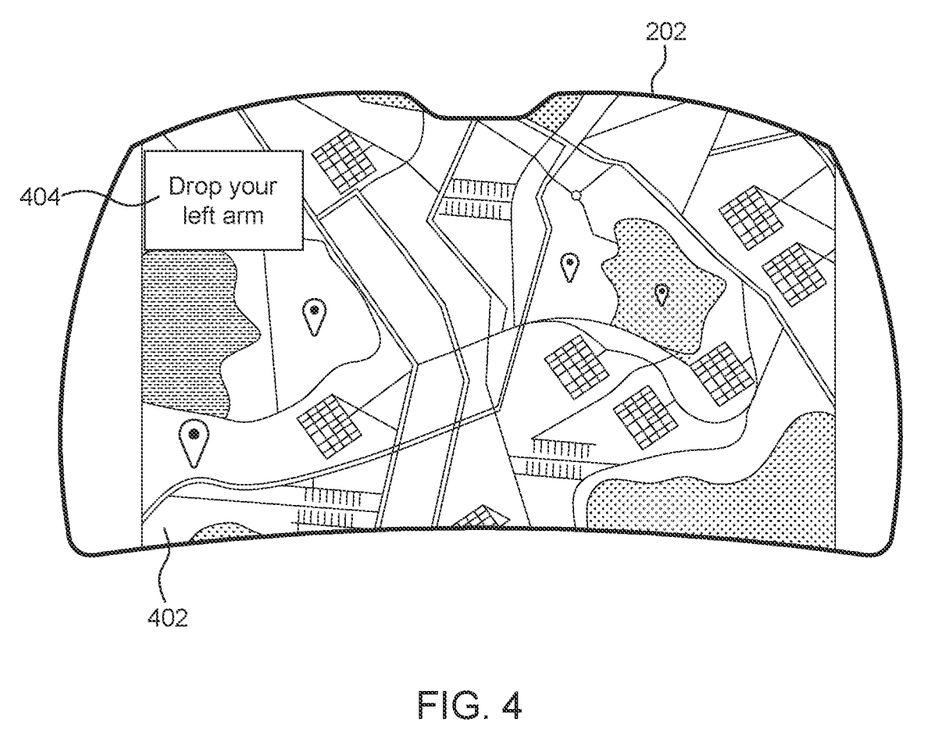
FIG. 4 depicts a second example AR image displayed on a display screen in accordance with the present disclosure.
Figure 5:
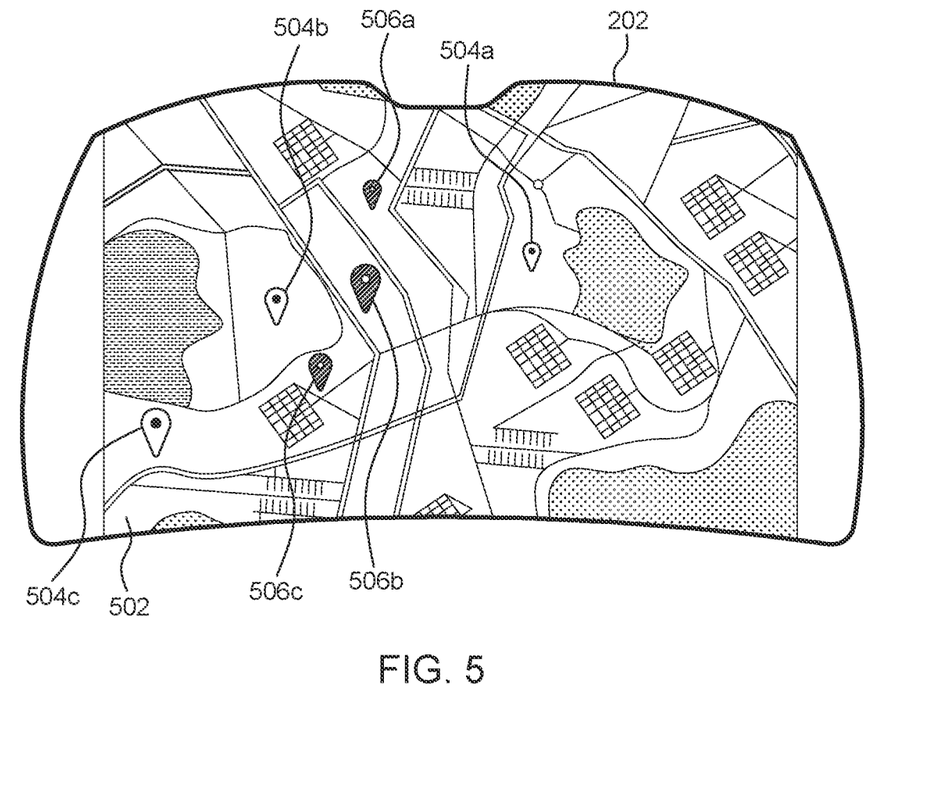
FIG. 5 depicts a third example AR image displayed on a display screen in accordance with the present disclosure.

In some aspects, the image capturing unit 212 may be a part of the device 200. In other aspects, the image capturing unit 212 may be separate from the device 200, and connected with the device 200 via wired or wireless communication protocol. In an exemplary aspect, the image capturing unit 212 may be disposed in proximity to the helmet visor/display screen 202 so that the images or "view" captured by the image capturing unit 212 may be substantially same as the view that the skydiver 102 may see from the helmet visor when the skydiver 102 performs the skydiving activity. Examples of the view captured by the image capturing unit 212 are depicted in FIGS. 3-5 and described later in the description below.

The network 206 may be, for example, a communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPA/HSDPA), Long-Term Evolution (LTE), Global System for Mobile Communications (GSM), and Fifth Generation (5G), to name a few examples.

The device 200 may further include a detection unit 214 that may be configured to detect device 200 trajectory information. In some aspects, the detection unit 214 may include one or more of: a Global Positioning System (GPS) receiver, an Inertial Measurement Unit (IMU) and an altimeter. The detection unit 214 may detect the device 200 trajectory information, which may include, but is not limited to, device 200 latitude, longitude, altitude, geolocation, speed, velocity, acceleration and heading, when the skydiver 102 wears the device 200 and performs the skydiving activity.

The device 200 may further include a memory 216 and a processor 218. In some aspects, the memory 216 may store programs in code and/or store data for performing various AR display device operations in accordance with the present disclosure. Specifically, the processor 218 may be configured and/or programmed to execute computer-executable instructions stored in the memory 216 for performing various AR display device functions in accordance with the disclosure. Consequently, the memory 216 may be used for storing code and/or data code and/or data for performing operations in accordance with the present disclosure.

In one or more aspects, the processor 218 may be disposed in communication with one or more memory devices (e.g., the memory 216 and/or one or more external databases (not shown in FIG. 2)). The memory 216 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 216 may be one example of a non-transitory computer-readable medium and may be used to store programs in code and/or to store data for performing various operations in accordance with the disclosure. The instructions in memory 216 can include one or more separate programs, each of which can include an ordered listing of computer-executable instructions for implementing logical functions.

In further aspects, the memory 216 may include a plurality of databases including, but not limited to, a real-world view database 220, a trajectory information database 222 and a point of interest (POI) information database 224. The functions of the plurality of databases are described later in the description below.

The device 200 may further include a speaker 226 that may be configured to output audio signals or notifications when the skydiver 102 wears the device 200 and performs the skydiving activity.

In some aspects, the skydiver 102 may use the device 200 to gamify the skydiving activity and/or display information associated with skydiving activity as an AR image, when the skydiver 102 wears the device 200. One or more example embodiments of device 200 usage are described below. The present disclosure is not limited to the example embodiments described below and should not be construed as limiting the present disclosure scope.

In operation, the skydiver 102 may send (via the user device 210) geolocation coordinates and/or altitude information for one or more points of interest (POI) that may be associated with the skydiving activity to the device 200. For example, the skydiver 102 may send GPS location coordinates and altitude information associated with the drop zone for the skydiving activity to the device 200. As further example, if the skydiving activity is associated with a training session or a skydiving challenge/contest, the skydiver 102 may send geolocation coordinates and/or altitude information of one or more "targets" or waypoints that the skydiver 102 may be required to pass or cross through, when the skydiver 102 performs the skydiving activity. In this case, if the skydiving challenge further requires the skydiver 102 to cross a specific target at a particular speed, the skydiver 102 may additionally send the corresponding speed information to the device 200. For example, if the skydiving activity requires the skydiver 102 to cross Target "A" along a skydiving track at a speed of 150 miles/hour and Target "B" at a speed of 125 miles/hour, the skydiver 102 may send this speed information along with the geolocation coordinates and altitude information of Targets "A" and "B" to the device 200.

In some aspects, the skydiver 102 may send the information described above to the device 200 before the skydiver 102 commences the skydiving activity. For example, the skydiver 102 may send the information to the device 200 when the skydiver 102 (and hence the device 200) is on the ground. Further, the skydiver 102 may use the user device 210 to send the information to the device 200 via the network 206. The user device 210 may transmit the information described above to the transceiver 204 via the network 206. Responsive to receiving the information, the transceiver 204 may send the information to the POI information database 224 for storage purpose.

In additional aspects, the skydiving entity or the operator that operates the server 208 may transmit the information (or a part of the information) described above to the device 200. In this case, the server 208 may transmit the information to the transceiver 204 via the network 206. Similar to the aspect described above, the server 208 too may transmit the information to the device 200 before the skydiver 102 commences the skydiving activity (i.e., when the device 200 is on the ground). Stated another way, the device 200 may be configured to receive the POI geolocation and the POI altitude information (and speed information associated with each target) from the server 208 or the user device 210.

The skydiver 102 may commence the skydiving activity when the information described above is stored in the POI information database 224.

When the skydiver 102 performs the skydiving activity (i.e., when the skydiver 102/device 200 is in the air and descending), the image capturing unit 212 may capture a real-world environment view. In some aspects, the real-world environment view may be same or substantially same as the view that the skydiver 102 may see when the skydiver 102 sees through the helmet visor. For example, the real-world environment view may be a view of the ground when the skydiver 102 is looking downwards towards the ground. In some aspects, the image capturing unit 212 may capture the real-world environment view at a predefined frequency, e.g., every 10 milliseconds (ms).

The image capturing unit 212 may transmit the captured real-world environment view to the transceiver 204 via the network 206. In some aspects, the image capturing unit 212 may transmit the captured real-world environment view to the transceiver 204 via Bluetooth® or a wired communication interface. Responsive to receiving the real-world environment view, the transceiver 204 may send the captured view to the real-world view database 220 for storage purpose.

In addition, when the skydiver 102 performs the skydiving activity, the detection unit 214 may detect the device 200 trajectory information including latitude, longitude (GPS location coordinates/geolocation), altitude, speed, velocity, acceleration and heading. The detection unit 214 may detect the device 200 trajectory information at a predefined frequency, e.g., every 10 ms. The detection unit 214 may send the device 200 trajectory information to the trajectory information database 222 for storage purpose.

The processor 218 may be configured to obtain the POI information, the real-world environment view and the device 200 trajectory information from the memory 216 (specifically, from the respective databases described above). Responsive to obtaining the above-mentioned information, the processor 218 may determine a POI location in the captured real-world environment view, based on the POI geolocation coordinates/altitude information and the device 200 trajectory information. For example, if the POI is the drop zone for the skydiving activity, the processor 218 may determine drop zone location in the captured real-world environment view based on the drop zone geolocation coordinates/altitude stored in the POI information database 224 and device 200 GPS location coordinates, altitude, heading, etc. In an exemplary aspect, in this case, the processor 218 may compare the device 200 GPS location coordinates and altitude with the drop zone GPS location coordinates and altitude to calculate a geo distance (e.g., by using Haversine formula) between the device 200 and the drop zone. Based on the calculated geo distance, the processor 218 may determine the drop zone location in the captured real-world environment view.

In a similar manner, if the POI includes multiple points, e.g., targets or waypoints, the processor 218 may determine location of each target in the captured real-world environment view.

Responsive to determining the POI location, the processor 218 may generate an AR image by overlaying a virtual object associated with the POI on the real-world environment view based on the determined POI location, and render the AR image on the display screen 202. The virtual object may be overlaid on the real-world environment view at the determined POI location. An example AR image is depicted in FIG. 3.

Specifically, FIG. 3 depicts a first example AR image 302 displayed on the display screen 202 in accordance with the present disclosure. The AR image 302 may be the view that the skydiver 102 may see when the skydiver 102 views the display screen 202. The AR image 302 may include one or more virtual objects 304a, 304b, 304c, 304d (collectively referred to as virtual objects 304) corresponding to one or more POI whose geo location coordinates/altitude information the skydiver 102 (or the skydiving operator) may have transmitted to the device 200 before the skydiver 102 commenced the skydiving activity.

As an example, the virtual object 304a may be associated with the drop zone for the skydiving activity that the skydiver 102 may be undertaking. In an exemplary aspect (not shown), the drop zone may be hidden by clouds and hence the skydiver 102 may not be able to view the drop zone in the real-world environment view (that the image capturing unit 212 may have captured). However, by overlaying a virtual object (e.g., a location icon) over the drop zone location on the captured real-world environment view, the present disclosure may enable the skydiver 102 to view the drop zone location, even when the drop zone may be hidden by clouds. By viewing the drop zone location, the skydiver 102 may accordingly maneuver body movement to reach the drop zone location.

As a further example, the virtual objects 304b, 304c, 304d may be associated with targets or waypoints that the skydiver 102 may be expected to cross, when the skydiver 102 traverses the skydiving track or performs the skydiving activity.

A person ordinarily skilled in the art may appreciate that although FIG. 3 depicts the virtual objects as location icons, other virtual objects or icons may also be used in the AR image 302, without departing from the present disclosure scope. The present disclosure is not limited to the icon design depicted in FIG. 3. Further, as shown in FIG. 3, the virtual objects/icons may have varying dimensions, based on the geo distance between the POI and the device 200. For example, as shown in FIG. 3, the virtual object 304a may have the smallest dimensions, as the drop zone location may be farthest from the device 200. Similarly, the virtual objects 304b, 304c, 304d may have dimensions that correspond to respective target/waypoint's geo distance from the device 200.

In further aspects, the processor 218 may add additional information on the AR image 302, which may facilitate the skydiver 102 during the skydiving activity. For example, the AR image 302 may include device 200 current geolocation and/or altitude above sea level and/or ground level, as shown in view 306. The AR image 302 may further include a difference between device 200 altitude and POI altitude. For example, in an exemplary aspect (not shown), the AR image 302 may include a difference between the device 200 altitude and the drop zone altitude next to or in proximity to the virtual object 304a. Additional information, e.g., temperature difference, GPS location, etc., associated with each POI may also be displayed along with the corresponding virtual object.

In an exemplary aspect where the skydiver 102 may be engaged in a skydiving contest or a training session, each target or waypoint along the skydiving track may have associated "virtual points". For example, Target "1" (corresponding to the virtual object 304b) may have 100 associated virtual points, Target "2" (corresponding to the virtual object 304c) may have 150 associated virtual points, and Target "3" (corresponding to the virtual object 304c) may have 80 associated virtual points. In this case, the skydiver 102 and/or the skydiving operator may send the corresponding virtual points (or count of virtual points) associated with each target to the device 200, before the skydiver 102 commences the skydiving activity. For example, the skydiver 102 and/or the skydiving operator may send the virtual points to the device 200 along with the POI geolocation/altitude information. As described above, the skydiver 102 may use the user device 210 and the skydiving operator may use the server 208 to send the virtual points to the device 200 (specifically to the transceiver 204). The transceiver 204 may receive the virtual points from the user device 210 or the server 208. Responsive to receiving the virtual points associated with each target, the transceiver 204 may transmit the virtual points to the POI information database 224 for storage purpose.

In the scenario described above, the processor 218 may additionally cause the AR image 302 to include (not shown in FIG. 3) the corresponding virtual points in proximity to the virtual objects 304b, 304c, 304d. Displaying the virtual points in proximity to the virtual objects may facilitate the skydiver 102 to easily view the points that the skydiver 102 may "gain" when the skydiver 102 crosses the corresponding target/waypoint.

In some aspects, the processor 218 may retrieve the corresponding virtual points (from the POI information database 224) and add the virtual points associated with a specific target to a skydiver 102 "virtual account" (that may be stored in the memory 216) when the skydiver 102 crosses the specific target. For example, the processor 218 may add 100 virtual points to the skydiver 102 virtual account when the skydiver 102 successfully crosses the Target "1" (corresponding to the virtual object 304b) during the skydiving activity. On the other hand, if the skydiver 102 misses the Target "1", the processor 218 may not add 100 virtual points to the skydiver 102 virtual account. Further, if the skydiver 102 is engaged in a skydiving contest involving a plurality of skydivers, virtual accounts associated with each skydiver may be compared at the end of the contest, and the skydiver with the highest count of virtual points may win the contest.

In the aspect described above, the processor 218 may further cause the display screen 202 to provide visual feedback (e.g., change of lights or display of additional icons such as "virtual coins" or "water splash") when the skydiver 102 successfully crosses the target. A different visual feedback may also be provided when the skydiver 102 misses the target. The processor 218 may additionally cause the speaker 226 to provide an audio feedback and/or the device 200 to provide haptic feedback, when the skydiver 102 successfully crosses or misses the target.

In some aspects, the contest may additionally require that each skydiver cross the targets with specific directional speeds or a specific velocity vector. For example, the contest may require each skydiver to cross Target "1" with a speed of 150 miles/hour. In this case, the processor 218 may cause the AR image 302 to display the speed in proximity to the virtual object 304b, and the processor 218 may add 100 virtual points to the skydiver 102 virtual account when the skydiver 102 crosses the Target "1" at the speed of 150 miles/hour (as detected by the detection unit 214).

In some aspects, the contest may additionally require that each skydiver cross the targets with a specific acceleration or acceleration vector. For example, the contest may require each skydiver to cross Target "1" with an arbitrary speed, while accelerating in any direction at 3 meters/second/second. In this case, the processor 218 may cause the AR image 302 to display the acceleration in proximity to the virtual object 304b, and the processor 218 may add 100 virtual points to the skydiver 102 virtual account when the skydiver 102 crosses the Target "1" at the acceleration of 3 meters/second/second (as detected by the detection unit 214).

A person ordinarily skilled in the art may appreciate that in the exemplary aspect of the skydiving contest described above, each skydiver may be allocated different targets and/or speeds (or acceleration) associated with each target. For example, an experienced skydiver may be allocated challenging targets along a skydiving track, and a trainee skydiver may be allocated easier targets.

The processor 218 may be further configured to provide training instructions to the skydiver 102 (e.g., when the skydiver 102 is a trainee) through the AR image. For example, the processor 218 may provide training instructions to the skydiver 102 when the skydiver 102 misses a specific target or when the skydiver 102 is skydiving in an improper manner. In the latter case, the processor 218 may determine the device 200 trajectory information (as detected by the detection unit 214) and may provide training instructions to the skydiver 102 when the device 200 heading, velocity and/or acceleration may be changing frequently (indicating that the skydiver 102 may be skydiving improperly).

In some aspects, the training instructions may be pre-stored in the memory 216. In this case, the memory 216 may pre-store training instructions associated with different skydiving maneuvers, and the processor 218 may fetch the training instructions and display them on the AR image 402, when the skydiver 102 may be skydiving improperly. In an exemplary aspect, the memory 216 may pre-store a mapping of threshold variations in heading, velocity and/or acceleration with corresponding training instructions, and the processor 218 may fetch the mapping when the processor 218 determines that the heading, velocity and/or acceleration of the skydiver 102 has deviated above the threshold. Responsive to fetching the mapping, the processor 218 may determine the training instructions to be given to the skydiver 102, based on the determined variation in heading, velocity and/or acceleration.

An example of training instructions is depicted in FIG. 4. Specifically, FIG. 4 depicts a second example AR image 402 displayed on the display screen 202 in accordance with the present disclosure. As shown in view 404, the AR image 402 may display a caption "Drop your left arm", when the processor 218 detects improper skydiving from the skydiver 102.

Although the aspect above describes that the memory 216 pre-stores the training instructions, in other aspects, the training instructions may be provided by the skydiving operator who may be stationed on the ground. In this case, the device 200 may transmit (via the transceiver 204) the device 200 trajectory information to the server 208 at a predefined frequency (e.g., every 10 ms), and the skydiving operator may provide training instructions to the device 200 by viewing/analyzing the device 200 trajectory information. For example, by viewing/analyzing the device 200 trajectory information, the skydiving operator may transmit (via the server 208) the training instruction "Drop your left arm" to the transceiver 204. The transceiver 204 may send the training instruction to the processor 218, which may display the instruction on the AR image 402.

In additional aspects, the processor 218 may provide the training instructions described above as audio feedback that may be output from the speaker 226.

Another example AR image is depicted in FIG. 5. Specifically, FIG. 5 depicts a third example AR image 502 displayed on the display screen 202 in accordance with the present disclosure. In the scenario depicted in FIG. 5, the AR image 502 may include two sets of virtual objects (e.g., location icons) corresponding to targets that may be associated with the skydiver 102 and another skydiver who may be skydiving along with the skydiver 102. For example, virtual objects 504a, 504b, 504c may be associated with skydiver 102a skydiving track and virtual objects 506a, 506b, 506c may be associated with skydiver 102b skydiving track. In the exemplary aspect depicted in FIG. 5, the AR image 502 is shown to display targets of both the skydivers 102a, 102b in the same AR image 502.

Display of other skydiver's targets may facilitate the skydiver 102 to know the location of the targets that the other skydiver may be attempting to cross. In some aspects, the device 200 may receive geolocation and altitude information associated with targets of both the skydivers 102a, 102b, before the skydivers 102a, 102b commence the skydiving activity, i.e., when the device 200 is on the ground. As described above, the device 200 may receive the geolocation and altitude information associated with the targets from the user device 210 or the server 208.

In additional aspects (not shown), the AR image 502 may include live geolocation and altitude information, and/or a count of virtual points in the virtual account associated with the other skydiver (e.g., the skydiver 102b), when the skydivers 102a, 102b perform the skydiving activity. Display of the virtual points in the virtual account associated with the skydiver 102b may assist the skydiver 102a to view the skydiver 102b performance. In this case, the device 200 may receive information (e.g., live geolocation/altitude information, virtual account information, etc.) from the device associated with the skydiver 102b via the network 206. In an exemplary aspect, the device 200 may receive the information via Bluetooth®.

In further aspects (not shown), the display screen 202 may also display real-world environment view and/or AR image that may be displayed on the device associated with the skydiver 102b. For example, if the skydiver 102b is looking at the skydiver 102a through the device associated with the skydiver 102b, the display screen 202 may depict the view of the skydiver 102a as seen by the skydiver 102b. In this case, the device 200 may receive live video or image stream from the device associated with the skydiver 102b, via the network 206 (e.g., Bluetooth®).

Although the description above describes embodiments or aspects of the present disclosure where the skydiver 102 (or the skydiving operator) provides POI geolocation and/or altitude information to the device 200 before the skydiver 102 commences the skydiving activity, in additional aspects, the POI may not be a fixed point on the ground or in the air. In this case, the POI may be a point that may be at a predetermined vertical distance from the skydiver 102. For example, the POI may be 500 or 1,000 feet below the skydiver 102.

In the aspect described above, the skydiver 102 (or the skydiving operator) may transmit the predetermined vertical distance (e.g., 500 or 1,000 feet) to the device 200 before commencing the skydiving activity. In this case, when the skydiver 102 starts the ascend to a skydiving commencement point (e.g., a drop point) using an airplane, the virtual point associated with the POI may "travel" along with the skydiver 102 and always be 500/1,000 feet below the skydiver 102. When the skydiver 102 commences the skydiving activity (i.e., when the skydiver 102 exits the airplane), the POI virtual point may get fixed.

In the aspect described above, there may be one POI that may be at 500 or 1,000 feet below the skydiver 102. In other aspects, there may be multiple POIs that may be below the skydiver 102 at different predetermined distances. For example, the skydiver 102 (or the skydiving operator) may transmit more than one predetermined distance of the POIs to the device 200, e.g., 500 feet, 1,000 feet, 1,500 feet, etc., before the skydiver 102 commences the skydiving activity. In this case, the device screen 202 may display virtual objects associated with POIs at 500, 1,000 and 1,500 feet when the skydiver 102 ascends to the skydiving commencement point. Similar to the aspect described above, the multiple POIs may get fixed when the skydiver 102 exits the airplane.

A person ordinarily skilled in the art may appreciate from the description above that the present disclosure provides a display screen that displays information associated with the skydiving activity to the skydiver 102 in an easy-to-understand manner. Specifically, since the processor 218 depicts the information as an AR image by overlaying information (e.g., virtual objects) over a real-world environment view, the skydiver 102 may not be distracted by the information when the skydiver 102 performs the skydiving activity.

Furthermore, a person ordinarily skilled in the art may appreciate that although the description above is described in conjunction with skydiving, the present disclosure, with some modification, may also be used when a user performs other activities, e.g., scuba diving, general aviation, skiing/ snowboarding, etc. In this case, the helmet visor may display additional information as AR image to the user, when the user is under water during the scuba diving activity.

Figure 6:
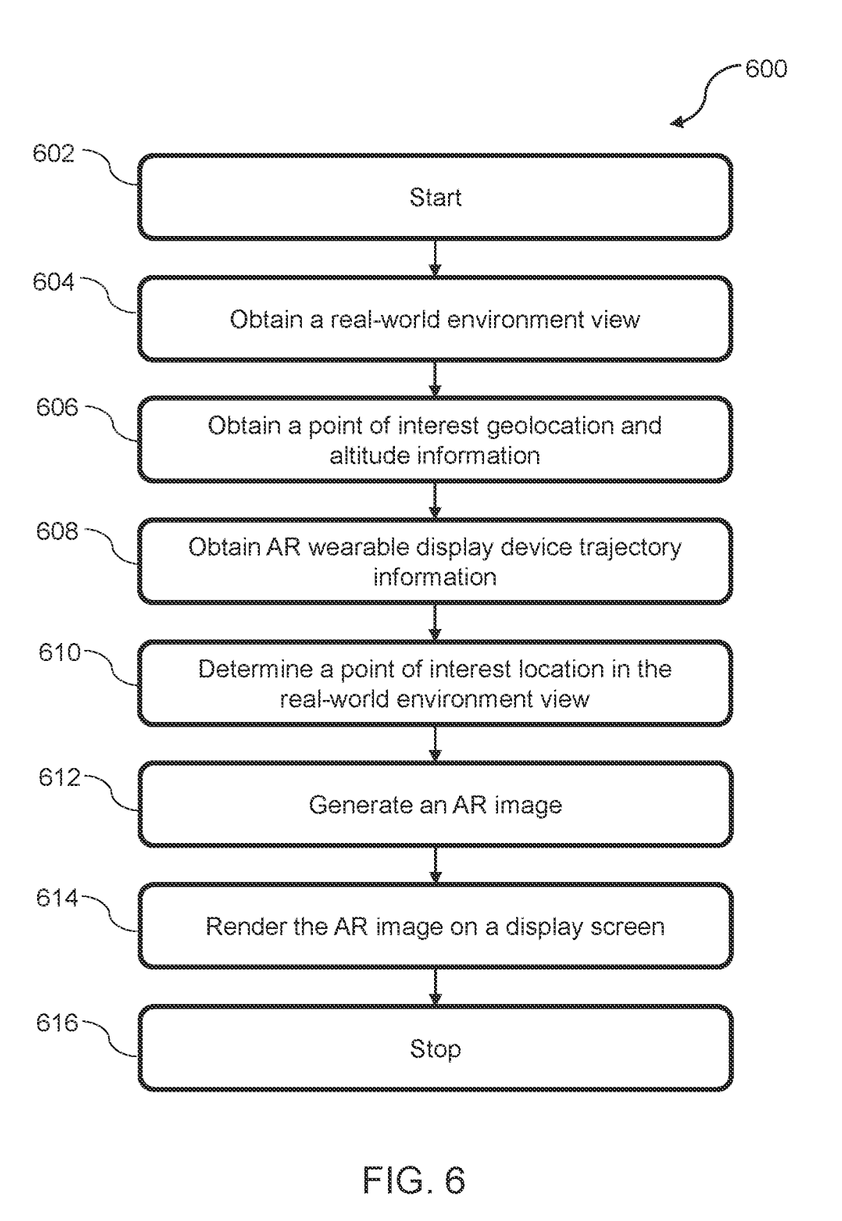
FIG. 6 depicts a flow diagram of an example method for displaying augmented data on an AR wearable display device in accordance with the present disclosure.

FIG. 6 depicts a flow diagram of an example method 600 for displaying augmented data on an AR wearable display device (e.g., device 200) in accordance with the present disclosure. FIG. 6 may be described with continued reference to prior figures, including FIGS. 1-5. The following process is exemplary and not confined to the steps described hereafter. Moreover, alternative embodiments may include more or less steps that are shown or described herein and may include these steps in a different order than the order described in the following example embodiments.

Referring to FIG. 6, at step 602, the method 600 may commence. At step 604, the method 600 may include obtaining, by the processor 218, the real-world environment view from the image capturing unit 212 or the real-world view database 220. As described above, the image capturing unit 212 may capture the real-world environment view when the skydiver 102 is performing the skydiving activity.

At step 606, the method 600 may include obtaining, by the processor 218, the POI geolocation and POI altitude information from the POI information database 224. At step 608, the method 600 may include obtaining, by the processor, the device 200 trajectory information from the trajectory information database 222.

Responsive to performing the steps 604, 606 and 608, the processor 218 may determine the POI location in the captured real-world environment view, based on the POI geolocation coordinates/altitude information and the device 200 trajectory information at step 610.

At step 612, the method 600 may include generating, by the processor 218, an AR image (e.g., the AR image 302) by overlaying a virtual object associated with the POI on the real-world environment view, based on the determined POI location.

At step 614, the method 600 may include rendering, by the processor 218, the AR image on the display screen 202.

At step 616, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An Augmented Reality (AR) wearable display device comprising:
    a display screen;
    a transceiver configured to receive:
        a real-world environment view from an image capturing unit, and
        a point of interest (POI) geolocation and POI altitude information associated with a POI from a server or a user device;
    a detection unit configured to detect AR wearable display device trajectory information, wherein the AR wearable display device trajectory information comprises a velocity, a geolocation and an altitude;
    a memory configured to store the real-world environment view, the POI geolocation and the POI altitude information, and the AR wearable display device trajectory information; and
    a processor communicatively coupled to the memory, wherein the processor is configured to:
        obtain the real-world environment view, the POI geolocation, the POI altitude information and the AR wearable display device trajectory information from the memory;
        determine a POI location in the real-world environment view based on the POI geolocation, the POI altitude information and the AR wearable display device trajectory information;
        generate an AR image by overlaying a virtual object associated with the POI on the real-world environment view based on the POI location; and
        render the AR image on the display screen.

2. The AR wearable display device of claim 1, wherein the AR wearable display device is a skydiving helmet.

3. The AR wearable display device of claim 1, wherein the AR wearable display device trajectory information further comprises an acceleration and a heading.

4. The AR wearable display device of claim 1, wherein the detection unit is a Global Positioning System (GPS) receiver, an Inertial Measurement Unit (IMU) and an altimeter.

5. The AR wearable display device of claim 1, wherein the POI is a drop zone for a skydiving activity.

6. The AR wearable display device of claim 5, wherein the processor is further configured to display, on the AR image, information associated with a difference between an AR wearable display device altitude and a drop zone altitude.

7. The AR wearable display device of claim 1, wherein the POI is a target along a skydiving activity trajectory.

8. The AR wearable display device of claim 7, wherein the transceiver is further configured to receive virtual points associated with the target from the user device or the server, and wherein the memory is configured to store the virtual points.

9. The AR wearable display device of claim 8, wherein the processor is further configured to display, on the AR image, information associated with the target, and wherein the information comprises at least one of:
    a difference between an AR wearable display device altitude and a target altitude; and
    the virtual points associated with the target.

10. The AR wearable display device of claim 9, wherein the processor is further configured to add the virtual points into a user virtual account when the AR wearable display device passes through the target in the skydiving activity trajectory, and wherein user virtual account information is stored in the memory.

11. The AR wearable display device of claim 10, wherein the processor is further configured to provide at least one of a visual feedback, an audio feedback and a haptic feedback when the AR wearable display device passes through the target.

12. The AR wearable display device of claim 10, wherein the processor is further configured to provide visual or audio training instructions when the AR wearable display device misses the target.

13. A method to display augmented data on an Augmented Reality (AR) wearable display device, the method comprising:
   obtaining, by a processor of the AR wearable display device, a real-world environment view from an image capturing unit;
   obtaining, by the processor, a point of interest (POI) geolocation and POI altitude information associated with a POI from a server or a user device;
   obtaining, by the processor, AR wearable display device trajectory information from a detection unit of the AR wearable display device, wherein the AR wearable display device trajectory information comprises a velocity, a geolocation and an altitude;
   determining, by the processor, a POI location in the real-world environment view based on the POI geolocation and the POI altitude information and the AR wearable display device trajectory information;
   generating, by the processor, an AR image by overlaying a virtual object associated with the POI on the real-world environment view based on the POI location; and
   rendering, by the processor, the AR image on a display screen of the AR wearable display device.

14. The method of claim 13, wherein the detection unit is a Global Positioning System (GPS) receiver, an Inertial Measurement Unit (IMU) and an altimeter.

15. The method of claim 13 further comprising:
   receiving the POI geolocation and the POI altitude information from the server or the user device; and
   storing the POI geolocation and the POI altitude information in an AR wearable display device memory.

16. The method of claim 13, wherein the AR wearable display device trajectory information further comprises an acceleration and a heading.

17. The method of claim 13, wherein the AR wearable display device is a skydiving helmet.

18. The method of claim 17, wherein the POI is a drop zone for a skydiving activity.

19. The method of claim 18, further comprising displaying, on the AR image, information associated with a difference between an AR wearable display device altitude and a drop zone altitude.

20. A non-transitory computer-readable storage medium in a distributed computing system, the non-transitory computer-readable storage medium having instructions stored thereupon which, when executed by a processor, cause the processor to:
   obtain a real-world environment view from an image capturing unit;
   obtain a point of interest (POI) geolocation and POI altitude information associated with a POI from a server or a user device;
   obtain AR wearable display device trajectory information from a detection unit of the AR wearable display device, wherein the AR wearable display device trajectory information comprises a velocity, a geolocation and an altitude;
   determine a POI location in the real-world environment view based on the POI geolocation and the POI altitude information and the AR wearable display device trajectory information;
   generate an AR image by overlaying a virtual object associated with the POI on the real-world environment view based on the POI location; and
   render the AR image on a display screen of the AR wearable display device.

* * * * *